(12) United States Patent
Goh et al.

(10) Patent No.: US 7,793,036 B2
(45) Date of Patent: Sep. 7, 2010

(54) METHOD AND ARRANGEMENTS FOR UTILIZING NAND MEMORY

(75) Inventors: Chee How Goh, Perak (MY); Eric Thian Aun Tan, Penang (MY); Chai Huat Gan, Penang (MY)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 11/807,694

(22) Filed: May 30, 2007

(65) Prior Publication Data

US 2008/0301397 A1    Dec. 4, 2008

(51) Int. Cl.
    *G06F 12/10* (2006.01)
(52) U.S. Cl. .................. 711/103; 711/202; 711/221
(58) Field of Classification Search .................. None
    See application file for complete search history.

(56) References Cited

U.S. PATENT DOCUMENTS

2007/0124531 A1*  5/2007  Nishihara ............... 711/3
2007/0294482 A1* 12/2007  Kadambi et al. ........ 711/137
2009/0100307 A1*  4/2009  Lee ........................ 714/746

* cited by examiner

*Primary Examiner*—Than Nguyen
(74) *Attorney, Agent, or Firm*—Schubert Law Group, PLLC; Neil Cohen

(57) ABSTRACT

A method of utilizing NAND type memory is disclosed herein. Operating system type instructions executable by a processor can be stored in a NAND based memory. The instructions can have logical addresses that can be utilized by the processor to fetch the operating system instructions. The method can store address conversions in the NAND based memory, where the address conversions can relate logical addresses to a physical address. At least one validity flag can be assigned to the address conversions. The processor can perform a direct read of the operating system instructions from the NAND based memory in response to a first setting of a validity flag and the processor can perform an indirect read of the operating system instructions by fetching an address conversion from the NAND based memory in response to a second setting of the at least one validity flag.

17 Claims, 2 Drawing Sheets

METHOD AND ARRANGEMENTS FOR UTILIZING NAND MEMORY

FIELD OF DISCLOSURE

The present disclosure is related to the field of memory systems and more particularly to the field of NAND type memory systems.

BACKGROUND

A traditional computer system has a processor that, on start up can retrieve code and data from memory devices such as a ROM chip and such code can dictate how the processor operates. A portion of this code and data can be placed in cache memory (fast efficient expensive memory proximate to the core of the processor) and the system can "boot up" on this retrieved code. When a system boots up it loads and executes code that controls basic operational functions. Part of this code is commonly referred to as a basic input output system or (BIOS). Generally, BIOS is built-in software that dictates how a processor interfaces with other systems and sub-systems and dictates what the processor can do without accessing executable programs or applications from a disk.

For example, on personal computers, the BIOS can contain all of the code required to control and interface the keyboard, display screen, disk drives, serial communication ports, and a number of miscellaneous functions such as house keeping functions (basic configurable functions). The BIOS can run as part of the startup sequence where the BIOS can configure devices and locate and load or "boot" the operating system. The function of the BIOS is important and often the information on the BIOS is stored in a non-volatile memory (NVM) such as read only memory (ROM) on an integrated circuit. NVM is typically separate from the other memory systems such as the hard drive to keep the BIOS sheltered from memory failures that are common for "non solid state" memory devices. For example, a hard disk can "crash" or fail and if the BIOS was on the disk the system could not be revived without an undue burden.

NVM such as ROM chips are relatively expensive and a major focus has been placed on increasing performance of such devices and reducing the cost of such devices. NOR type flash memory has gained in popularity because it is a relatively inexpensive type of memory and NOR memory has been utilized to store operating system code namely BIOS code. NAND has not been utilized due to the inherent drawbacks in such a memory type. For example, NAND flash type memory has a slower read access time than other memory topologies such as NOR memory. Also, when a location in NAND memory is read multiple times, the charge held by the memory cells or in the transistor gate of the cell that represents the stored value, can be depleted or disturbed leading to system failures. Further, "over-read" sectors or overused portions of memory can fail or wear out leading to bad sectors in the memory. Thus, uniform distribution of memory usage can lead to higher reliability and longer memory life.

In addition, NAND based memory has a non-linear interface, where the stored code cannot be directly addressable by the processor. Thus, due to these shortcomings and others NAND type memory has not been utilized for storing BIOS code and operating system code. Instead NAND type memory has typically been utilized in devices such as uniform serial bus type "drives" or as storage for application software and application data. It can be appreciated that production cost for NAND flash type memory are approximately half the production costs for NOR type memory and NAND memory is more compact.

BRIEF DESCRIPTION OF THE DRAWINGS

Aspects of the disclosure will become apparent upon reading the following detailed description and upon reference to the accompanying drawings in which, like references may indicate similar elements.

DETAILED DESCRIPTION OF EMBODIMENTS

Figure 1:
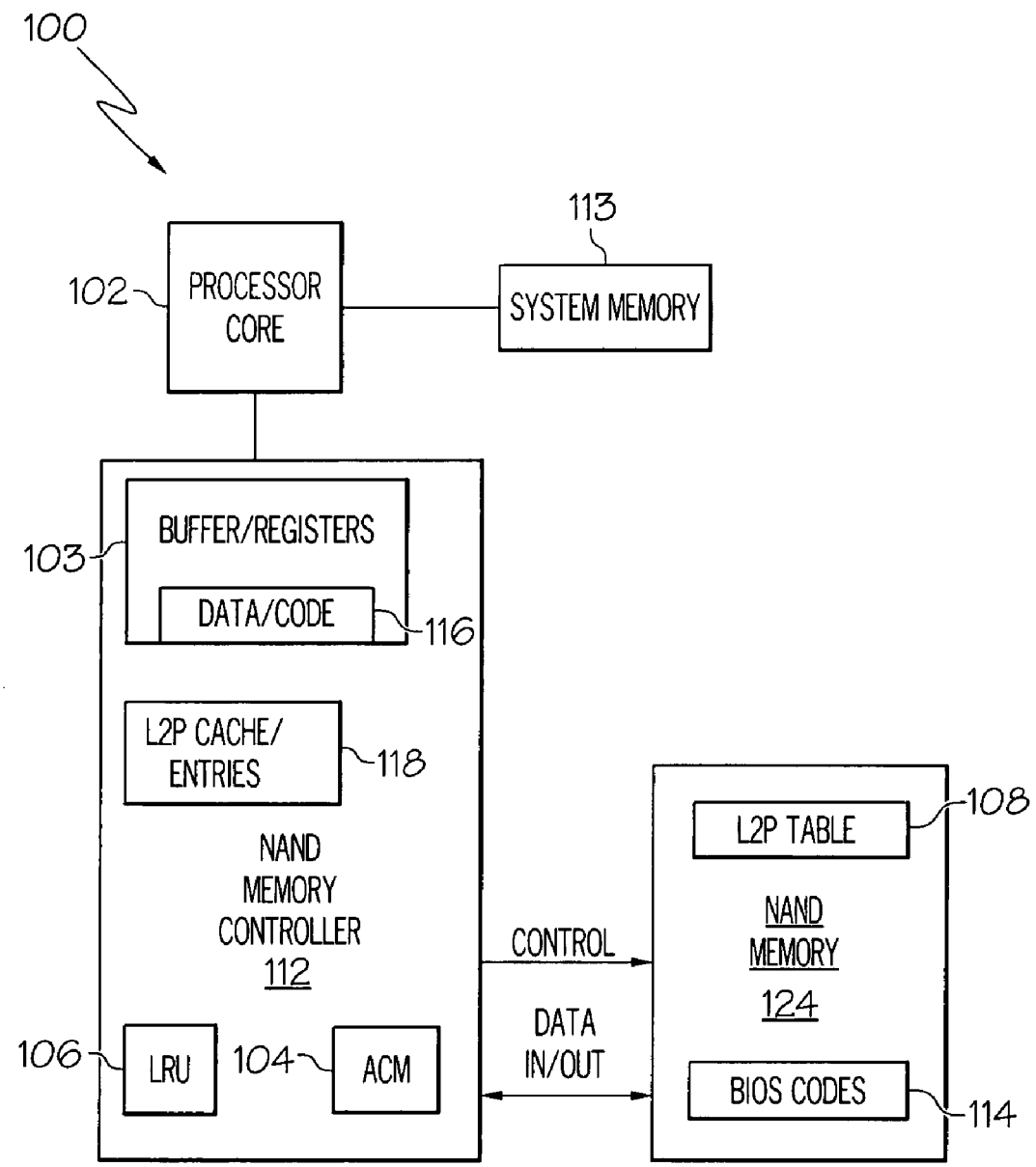
FIG. 1 depicts a block diagram of a processing system.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

While specific embodiments will be described below with reference to particular configurations of hardware and/or software, those of skill in the art will realize that embodiments of the present disclosure may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

In accordance with the present disclosure, NAND type memory is utilized to store operating system type code such as BIOS code and in addition, the NAND memory can be utilized, with proper management techniques, to enable Execution-In-Place or XIP of code including application code. It can be appreciated that NAND memory has many advantages and many draw backs some of which are mentioned above. As mentioned above, one significant problem when implementing NAND memory for an XIP configuration is that continual access to portions of NAND memory can deplete the stored charges or disturb the charges stored by memory cells causing serious failures. If a charge on the floating gate of a NAND cell becomes depleted then during the next read cycle the processor will retrieve "bad" or corrupt data possibly leading to a system failure.

One way to solve such a depletion problem is to move frequently read data to different memory locations within the NAND memory array to keep the stored data fresh, or refreshed. The movement of code to ensure its validity can be accomplished utilizing indirect addressing. Indirect addressing can be accomplished in many ways including using mapping, an address conversion table or look up table to convert a logical address to a physical address (L2P).

Thus, the processor can operate utilizing a logical address and a (L2P) mapping module can provide a look up table to convert the logical address to the physical address such that code can be retrieved from a physical location having a physical address utilizing a logical address. It can be appreciated that the physical address location of code can change to keep the NAND memory reliable, and the logical address utilized by the processor can remain unchanged. The L2P mapping module can rearrange or move data to different physical locations and track the physical location of code where the processor is unaffected by such movement of the code because it utilizes a logical address to find and retrieve the code it needs.

As can be appreciated, a L2P module must be continually updated such that the location of specific lines of code is known as the code moves to different locations in the NAND memory. The L2P module can also track portions of code that has been moved to or copied into higher quality memory such as cache, buffers or registers. In addition, the L2P module can monitor NAND memory operations and ensure that the majority of the blocks of data are erased or read at roughly the same frequency (uniform memory usage) and such a process can extend the life of the memory. Spreading memory usage evenly across the entire memory can provide "wear-leveling" where no single sector or portion of memory will fail prematurely due to over use and this will prolong the lifespan of the memory.

In accordance with the present disclosure, in one embodiment a method of utilizing NAND type memory is disclosed. Operating system type instructions executable by a processor can be stored in a NAND based memory. The instructions can have logical addresses that can be utilized by the processor to retrieve the operating system instructions. The method can store address conversions in the NAND based memory, where the address conversions can relate logical addresses utilized by the processor to an ever changing physical address. Validity flags can be assigned to individual address conversions to track a status of individual conversion entries in the table and to indicate whether the physical memory location is directly accessible by the processor. The processor can perform a direct read of the operating system instructions from the NAND based memory in response to a setting of a validity flag and the processor can perform an indirect read of the operating system instructions by fetching an address conversion from the NAND based memory in response to a different setting of the validity flag.

In another embodiment an apparatus that utilized NAND based memory for storing operating system instructions is disclosed. The apparatus can include a processor, an address conversion module that monitors at least one validity flag associated with address conversions and NAND based memory to store operating system code and to store address conversions. The address conversions can associate a logical address with a physical address. The processor can directly retrieve contents from the NAND memory based on a first setting of a validity flag and can utilize the address conversion module to indirectly retrieve contents in response to a second setting of the validity flag.

Referring to FIG. 1, a NAND based apparatus/system 100 is illustrated. The system 100 can include a processor core 102, system memory 113, NAND memory 124, a logical to physical (L2P) module 108 possibly stored in NAND memory 124, and BIOS code 114 also possibly stored in NAND memory 124. The system can also include NAND memory controller 112 that can store a least recently used (LRU) module 106, at least an address conversion module (ACM) 104, at least portions of a L2P table 118 and at least buffers or registers 103 that can store data code 116. The NAND memory 124 disclosed herein is commonly referred to as NAND flash but will be referred to herein as just NAND memory.

During power up of the system 100, the processor core 102 can read the BIOS code 114 from NAND memory 124. In accordance with caching procedures, over time, the logical to physical L2P module 108 or portions of entries into the module 108 can be stored in the L2P cache 118 in NAND controller 112 and the BIOS code 114 can be retrieved from NAND memory 124 by the processor core 102 and placed into system memory 113. Thus, over time the processor core 102 can use the BIOS code from NAND 114 or from system memory 113 to configure basic operational features of a computer having the illustrated components.

In accordance with the present disclosure, the processor core 102 can conduct a direct read to the BIOS code region 114 in the NAND memory 124 and such a read can occur without any assistance from memory management devices as with traditional processing systems. When a request to access the NAND memory 124 is made by the processor 102, the ACM 104 can first perform validity or "security" checking of the addresses contained in the fetch/retrieval request from the processor to ensure that direct read cycles between the processor core 102 and the NAND memory 124 are allowed by the system. In one embodiment, such direct access may not be allowed if the requested code is not located in the BIOS region 114. Further, if the requested code or data is available in buffers 103 in the NAND memory controller 112, the code or data can be retrieved from such an efficient location. When the address in invalid and direct access to NAND memory 124 is not allowed, the ACM 104 can access the L2P table 108 and perform a L2P conversion such that the requested code or data is provided to the processor core 102 indirectly.

Based on the validity setting in the ACM 104, the ACM 104 can also check cache 118 for a valid address. If the address is valid based on a flag, the ACM 104 may translate the requested/host address to the physical address location in the system using the L2P translation. If the address in cache 118 is not valid, the ACM 104 can request and the NAND memory 124 can send, requested L2P contents stored by the NAND memory 124. In this embodiment, controller 112 can fetch four L2P entries at a time from a flash descriptor region in the L2P table 108. If the BIOS direct read address provided by the processor 102 provides a hit in the L2P cache 118, the L2P translation can be performed quickly. In this configuration one sector (512 bytes) of the BIOS codes 114 can be fetched from the NAND memory 124 and placed into buffers 103 and then the BIOS codes 114 can be send to system memory 113 if needed.

In one embodiment, one sector can be chosen as a minimum granularity for retrieval from memory because traditional error correction schemes typically operate on a sector basis. However, other size retrieval requests from memory would not part from the scope of the present disclosure. Once the sector has been fetched and loaded into buffers 103, an integrity checker can check the fetched data and perform and the code/data can be read out one double word (DW) at a time by the processor core 102 as the BIOS is set up.

If a direct read attempt cannot find the required L2P entry in the cache 118 (a cache miss occurs possibly due to the status of the validity flag), a fetch command can be generated to retrieve the L2P table 108 or a portion of the L2P table 108 from NAND to obtain the current L2P mapping for the requested data/code. After retrieval of the required L2P conversion data, the L2P translation can then be performed by the ACM 104 and a sector read can be subsequently initiated by the controller 112 to the NAND memory 124. When cache 118 is full at least a portion of the cache 118 must be purged to make room for the new L2P entries. The "L2P replacement policy" for cache 118 can be performed based on the Least Recently Used (LRU) module 106 performing such a procedure/algorithm. The LRU module 106 can remove a least recently used item or piece of code or data from cache 118 when the system requires new or updates L2P data among other things. A least recently used line or item can be considered as the item stored in cache 118 which has not been used for the longest period of time or longest number of clock cycles.

If the L2P cache is full and a "miss" happens, (the L2P correlation is not available in cache 118), the least recently used entry in cache 118 can be removed from the cache 118 to provide room for caching the newly fetched L2P entry. Once the sector of 512-bytes data is available in the data registers/buffers 103/116 and passes data integrity check, the required amount of data can be provided to the processor core 102 as BIOS instructions.

The disclosed system can provide further enhancements in caching by preserving the data in internal data buffer/registers 103 when a flush event occurs in the cache 118. If a subsequent cycle requests a direct read from the same memory location in NAND memory 124, the code/data requested is already available inside the data buffer/register 103/116 or will be fetched into the data buffer/register 103/116 in the coming sector (within a page), then the required amount of data can be returned to the processor core 102 directly from the data buffer/register 103/116 without initiating another sector read to the NAND memory 124. Such a procedure can be facilitated with validity flags as managed by the ACM 114. For example, a flush of the cache 118 can be initiated when; a subsequent cycle is a write, a read from a different master occurs, a read initiated via register-based access occurs, or a read from the same master occurs that does not fall within the sectors that has been or will be cached and the validity flags can be updated accordingly.

As stated above, the NAND memory 124, controller 112 buffers/registers 103 can store in duplicate or triplicate, BIOS power-on boot loaders and BIOS software. The NAND memory 124 can perform disk caching as well as perform as a solid state disk (SSD) to provide large quantities of fast, inexpensive solid state data storage that contains no moving parts and can provide non-volatile memory (NVM). Although NAND memory 124 can replace traditional high cost storage solutions NAND memory can also provide improved input/output performance of a processing system. In particular, such a NAND system 100 can be effectively utilized in a personal computer system and can eliminate non-solid state memory such as disk drives. Due to its lower cost, smaller size and high availability, NAND memory 124 can provide improved performance for data storage particularly when it is properly operated/managed. The disclosed NAND system can provide one memory type-for-all solutions, enabling NAND flash to be used to store operating system data as well as applications as well as data.

The disclosed system 100 with the NAND controller module 112 will allow "execution-in-place" (XIP) type operation to occur. Accordingly, a personal computer can allow the BIOS to boot up utilizing direct access to the NAND memory 124 instead of from traditional NOR flash memory that is dependent on a serial peripheral interface (SPI), or from disk drives as in traditional configurations.

An elimination of the requirement for a SPI, a disk drive controller etc, can save money in the manufacture of each platform and can increase reliability and speed up the data retrieval process. Additionally, with the arrangements and mechanisms disclosed herein, a microcontroller such as a memory access controller is not required to enable the BIOS boot directly from the NAND memory 124. NAND memory 106 can operate at 53 MB/s with a 40 MHz clock and thus in addition to a lower cost, the speed of the BIOS boot up can be accomplished more than ten times faster compared to serial peripheral interface (SPI) NOR type memory that commonly operate at 4 MB/s. Further, the disclosed system 100 can also allow for a reduction in the area required on a motherboard to implement a personal computer. In one embodiment consolidating the entire non-volatile memory requirement for a personal computer platform in a central NAND component can be achieved.

Figure 2:
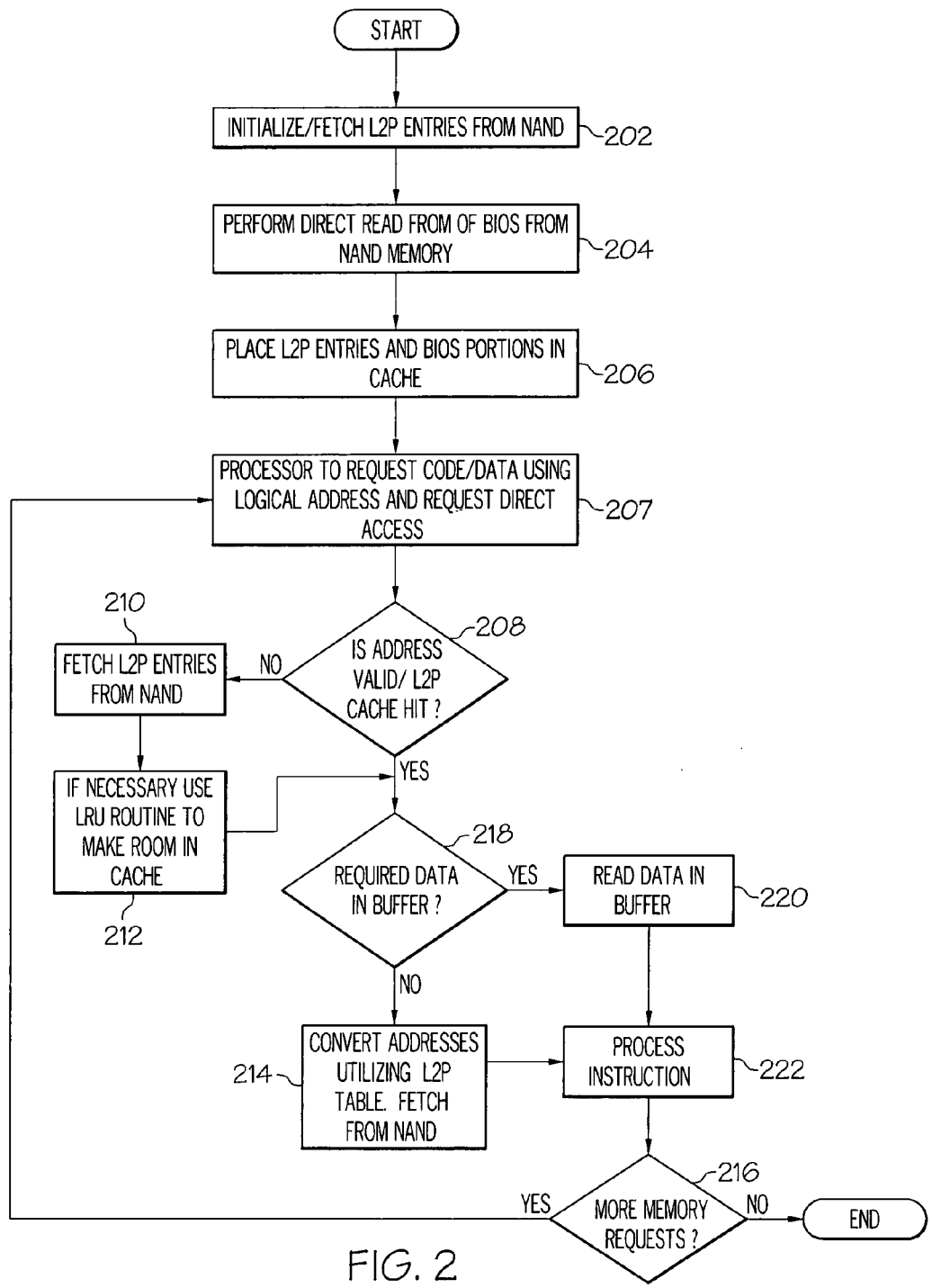
FIG. 2 is a flow diagram of operating a processing system.

Referring to FIG. 2, a flow diagram for operating a NAND memory system is disclosed. As illustrated in block 202, the system can be initialized. In one embodiment, the logical to physical (L2P) table for the BIOS code space mapping can be fetched from NAND based memory and placed in buffers or cache. As illustrated in block 204, the BIOS can be read directly from NAND based memory in a direct read cycle. The system can re-attempt such reads until the BIOS is read from the NAND memory.

As illustrated by block 206, the fetched L2P entries and the fetched BIOS can be placed in cache memory and/or buffers. The processor as it operates can continually request code and data using a logical address and request direct access to code or data as illustrated by block 207. As illustrated in decision block 208, as the processor core is continually requesting code and data, the request can be analyzed to see if the address is valid and if a cache hit has occurred.

If there is a valid address or a cache hit, then the system can look to see if there is data in the buffer as illustrated by decision block 218. If the requested data is present in the buffer, then the data can be read from the buffer as illustrated in block 220 and the instruction can be processed as illustrated in block 222. If the data is not located in the buffer in decision block 218, then the address can be converted and the data can be fetched from NAND as illustrated by block 214 and the execution of the instruction can take place as illustrated by block 222.

Referring back to decision block 208 if there is not a cache hit or there is a cache miss, then as illustrated by block 210, the L2P table can be fetched from NAND based memory. As illustrated by block 212, a LRU routine can be utilized to make room in the cache memory if necessary. It can then be determined if the required data is in a buffer as illustrated by block 218 and the method can progress from block 218 as described above. After the instruction is processed it can be determined if there are more memory requests, as illustrated by decision block 216. If there are pending memory requests, the process can revert to block 207 and if no additional code/data has been requested, the process can end.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present disclosure, represent embodiments of the present disclosure.

The disclosed embodiments can take the form of an entirely hardware embodiment, an entirely software embodiment or an embodiment containing both hardware and software elements. In one embodiment, the arrangements can be implemented in software, which includes but is not limited to firmware, resident software, microcode, etc. Furthermore, the disclosure can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The control module can retrieve instructions from an electronic storage medium. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present disclosure contemplates methods, systems, and media that provide a universal front end. It is understood that the form of the arrangements shown and described in the detailed description and the drawings are to be taken merely as examples. It is intended that the following claims be interpreted broadly to embrace all the variations of the example embodiments disclosed.

What is claimed is:

1. A method comprising;
    storing operating system instructions in a NAND based memory, the instructions executable by a processor, the instructions having a logical address to be utilized by the processor to fetch the operating system instructions;
    storing address conversions in the NAND based memory, the address conversions relating the logical address to a physical address of the operating system instructions in the NAND based memory, the address conversions having at least one validity flag;
    performing a direct read of the operating system instructions from a region of the NAND based memory in response to a first setting of the at least one validity flag, the first setting indicating that a direct read from the region of the NAND based memory is permissible; and
    performing an indirect read of the operating system instructions from another region of the NAND based memory by fetching an address conversion from the NAND based memory in response to a second setting of the at least one validity flag, the second setting indicating that a direct read from the other region of the NAND based memory is not permissible.

2. The method of claim 1, further comprising caching the address conversions wherein the address conversion provides an association between the logical address and the physical address.

3. The method of claim 2, wherein caching comprises utilizing a least recently used routine.

4. The method of claim 2, further comprising:
    maintaining a second validity flag to indicate whether a cached address conversion is current;
    checking the cache for an address conversion for a logical address;
    reading an address conversion from the cache when the second validity flag indicates the address conversion for the logical address is current; and
    reading an address conversion from the NAND based memory when the second validity flag indicates the address conversion for the logical address is not current.

5. The method of claim 1, further comprising:
    moving the operating system code to a different location in the NAND based memory;
    resetting the at least one validity flag; and
    updating the address association in the NAND based memory.

6. The method of claim 1, further comprising:
    checking whether the operating system instructions are available from a buffer before reading the instructions from the NAND based memory;
    retrieving the operating system instructions from the buffer if it is available in the buffer, thereby avoiding the retrieval of the operating system instructions from the NAND based memory;
    and retrieving the operating system instructions from the NAND based memory if the operating instructions are not available in the buffer.

7. The method of claim 1, further comprising conducting a direct read of the operating system instructions during a system boot and loading the address conversion directly from the NAND based memory during a system boot.

8. The method of claim 1, further comprising executing in place application instructions stored in the NAND based memory.

9. The method of claim 1, wherein:
    the performing a direct read comprises performing a direct read of the operating system instructions from the region of the NAND based memory in response to the first setting of the at least one validity flag, the first setting indicating that the direct read is a read from a BIOS region: and
    the performing an indirect read comprises not allowing direct access if the requested code is not located in a BIOS region.

10. The method of claim 1, wherein the performing a direct read comprises performing a direct read of the operating system instructions from a region of the NAND based memory without any assistance from a NAND memory access microcontroller.

11. An apparatus comprising:
    a processor;
    an address conversion module to monitor at least one validity flag associated with address conversions; and
    NAND based memory to store operating system code and to store address conversions that associate a logical address with a physical address wherein the processor is to directly retrieve contents from a region of the NAND memory based on a first setting of the validity flag, the first setting to indicate that a direct read from the region of the NAND based memory is permissible, and to utilize the address conversion module to indirectly retrieve contents from the region of the NAND based memory in response to a second setting of the validity flag, the second setting to indicate that a direct read from the region of the NAND based memory is not permissible.

12. The apparatus of claim 11, further comprising cache coupled to the processor to cache the address conversions, wherein the address conversion provides an association between the logical address and the physical address.

13. The apparatus of claim 12, further comprising a least recently used module coupled to the cache to accommodate one of fetched instructions or data.

14. The apparatus of claim 11, further comprising at least one buffer coupled to the processor to buffer one of instructions or data; wherein the address conversion module is to:
   check whether the operating system instructions are available from a buffer before reading the instructions from the NAND based memory;
   retrieve the operating system instructions from the buffer if it is available in the buffer, thereby avoiding the retrieval of the operating system instructions from the NAND based memory; and
   retrieve the operating system instructions from the NAND based memory if the operating instructions are not available in the buffer.

15. The apparatus of claim 11, wherein:
   the operating system code is basic input output system (BIOS) code;
   the first setting to indicate that the direct read is from a region of the NAND based memory containing BIOS; and
   the second setting to indicate that the direct read is from a region of the NAND based memory not containing BIOS.

16. The apparatus of claim 11, wherein the processor can execute in place applications stored in the NAND based memory and the address conversion module to convert a fetch request with logical addresses to a fetch request with physical addresses.

17. The apparatus of claim 11, wherein the operating system instructions are stored exclusively in the NAND based memory.

* * * * *